(12) United States Patent
Schuster

(10) Patent No.: US 11,591,941 B2
(45) Date of Patent: Feb. 28, 2023

(54) INTERNAL COMBUSTION ENGINE EXHAUST MODIFICATION SYSTEM

(71) Applicant: Sonix Enterprises Inc., London (CA)

(72) Inventor: Fridolin Schuster, London (CA)

(73) Assignee: Sonix Enterprises Inc., London (CA)

( * ) Notice: Subject to any disclaimer, the term of this patent is extended or adjusted under 35 U.S.C. 154(b) by 0 days.

(21) Appl. No.: 17/589,986

(22) Filed: Feb. 1, 2022

(65) Prior Publication Data

US 2022/0154610 A1 May 19, 2022

Related U.S. Application Data

(63) Continuation-in-part of application No. 17/088,696, filed on Nov. 4, 2020, now Pat. No. 11,274,583.

(60) Provisional application No. 62/930,624, filed on Nov. 5, 2019.

(51) Int. Cl.
| | |
|---|---|
| *F01N 3/00* | (2006.01) |
| *F01N 3/022* | (2006.01) |
| *B01D 46/00* | (2022.01) |
| *B01D 41/04* | (2006.01) |
| *B01D 46/62* | (2022.01) |

(52) U.S. Cl.
CPC .............. *F01N 3/022* (2013.01); *B01D 41/04* (2013.01); *B01D 46/0041* (2013.01); *B01D 46/62* (2022.01); *B01D 2279/30* (2013.01)

(58) Field of Classification Search
CPC .... F01N 3/022; F01N 2290/04; F01N 13/082; B01D 46/0041; B01D 46/62; B01D 2279/30

See application file for complete search history.

(56) References Cited

U.S. PATENT DOCUMENTS

| | | | |
|---|---|---|---|
| 2,162,683 A | * 6/1939 | Tobin | B60K 13/04 181/262 |
| 3,393,668 A | 7/1968 | Milgram | |
| 3,964,875 A | * 6/1976 | Chang | F01N 3/2892 138/40 |
| 5,083,435 A | * 1/1992 | Lin | F01N 3/023 60/311 |

(Continued)

FOREIGN PATENT DOCUMENTS

| | | |
|---|---|---|
| CN | 2043278 U | 8/1989 |
| CN | 202187811 U | 4/2012 |

(Continued)

*Primary Examiner* — Matthew T Largi

(57) ABSTRACT

An internal combustion engine exhaust modification system for transforming exhaust emissions from an internal combustion engine into modified exhaust emissions. The exhaust modification system includes a housing extending between inlet and outlet ends thereof. The system also includes an impeller rotatably mounted in the housing, and a filter subassembly downstream from the impeller. The filter subassembly removes part of particulate matter and liquid droplets in the exhaust emissions to transform the exhaust emissions into modified exhaust emissions. The system includes a conduit extending between an inner end thereof positioned to direct cooler air exiting therefrom into the housing toward the filter subassembly, and an outer end thereof. The system also includes a funnel subassembly having a funnel body for directing the cooler air into the outer end of the conduit.

3 Claims, 6 Drawing Sheets

(56) References Cited

U.S. PATENT DOCUMENTS

| | | | |
|---|---|---|---|
| 5,135,551 A | 8/1992 | Fielding | |
| 5,169,604 A * | 12/1992 | Crothers, Jr. | F01N 13/1888 422/177 |
| 5,417,727 A | 5/1995 | Bowen et al. | |
| 5,469,702 A | 11/1995 | Tuma et al. | |
| 5,609,021 A * | 3/1997 | Ma | F01N 3/22 60/285 |
| 5,916,134 A | 6/1999 | Yang | |
| 6,502,392 B1 | 1/2003 | Paas | |
| 6,584,768 B1 * | 7/2003 | Hecker | F01N 3/035 55/318 |
| 7,240,483 B2 | 7/2007 | Cizeron | |
| 7,584,748 B2 | 9/2009 | Freese, V | |
| 7,987,666 B2 | 8/2011 | Branning et al. | |
| 2004/0187456 A1 | 9/2004 | Bruck | |
| 2006/0124384 A1 | 6/2006 | Tary et al. | |
| 2007/0144158 A1 | 6/2007 | Girard | |
| 2007/0169452 A1 * | 7/2007 | Grimm | F01N 3/0211 55/523 |
| 2009/0071432 A1 * | 3/2009 | Carpenter | F02M 35/1261 123/184.57 |
| 2009/0100826 A1 | 4/2009 | Stewart | |
| 2009/0188389 A1 * | 7/2009 | Dacosta | B01D 39/06 55/525 |
| 2009/0235653 A1 | 9/2009 | Mital | |
| 2009/0301068 A1 | 12/2009 | Fujita | |
| 2010/0275587 A1 | 11/2010 | Schindler | |
| 2011/0023452 A1 * | 2/2011 | Gisslen | F01N 13/1844 60/272 |
| 2011/0072791 A1 * | 3/2011 | Bidner | B60K 6/485 60/287 |
| 2011/0072792 A1 * | 3/2011 | Bidner | F02D 41/029 60/296 |
| 2011/0173962 A1 | 7/2011 | Miwa | |
| 2011/0239980 A1 | 10/2011 | Batzold | |
| 2021/0087958 A1 | 3/2021 | Uehara | |

FOREIGN PATENT DOCUMENTS

| | | | |
|---|---|---|---|
| CN | 209892316 U | 1/2020 | |
| ES | 170993 U | 12/1971 | |
| FR | 3041687 A1 * | 3/2017 | F01N 3/0238 |
| JP | 2005054587 A | 3/2005 | |
| JP | 2010242643 A * | 10/2010 | |
| JP | 2010242643 A | 10/2010 | |
| KR | 101699751 B1 | 1/2017 | |
| KR | 101910435 B1 | 10/2018 | |
| KR | 102072334 B1 | 1/2020 | |

* cited by examiner

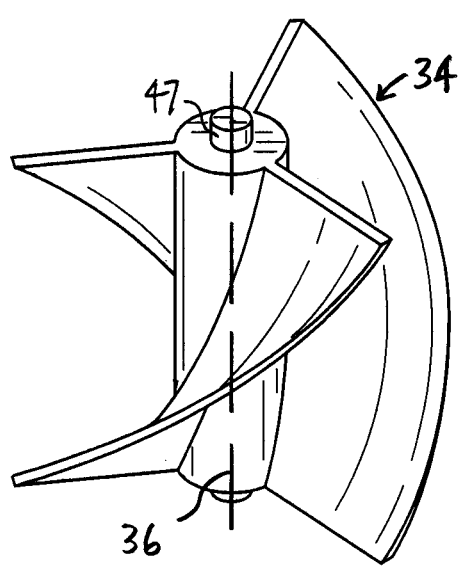 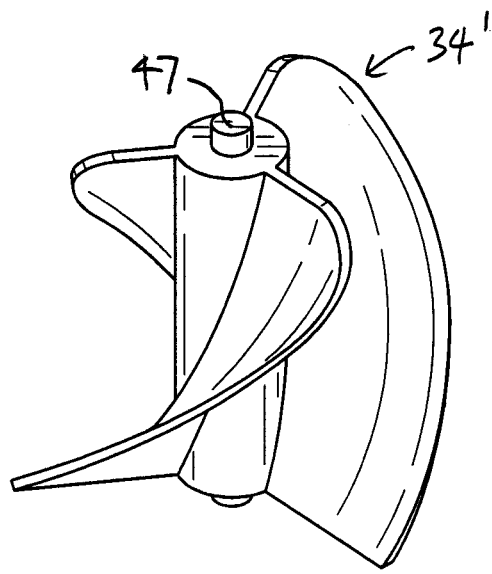
FIG. 2A  FIG. 2B
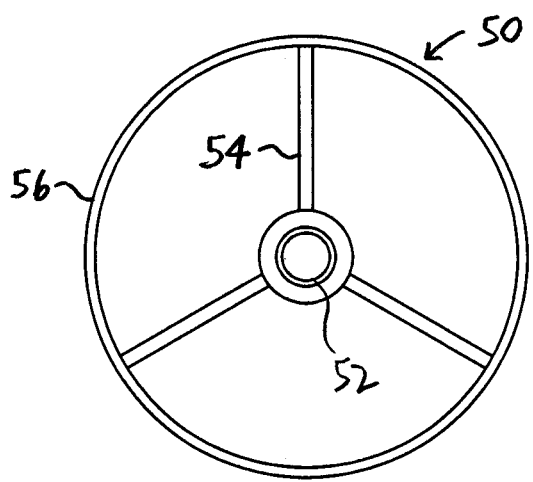 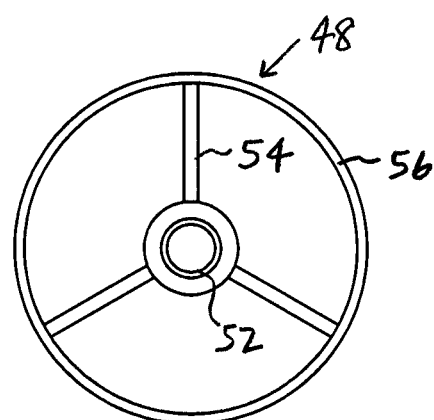
FIG. 3A  FIG. 3B

INTERNAL COMBUSTION ENGINE EXHAUST MODIFICATION SYSTEM

CROSS-REFERENCE TO RELATED APPLICATION

This application is a continuation-in-part of U.S. patent application Ser. No. 17/088,696, filed on Nov. 4, 2020, and claims the benefit of U.S. Provisional Patent Application No. 62/930,624, filed on Nov. 5, 2019, the entirety of each of which is hereby incorporated herein by reference.

FIELD OF THE INVENTION

The present invention is an internal combustion engine exhaust modification system, for transforming exhaust emissions into modified exhaust emissions.

BACKGROUND OF THE INVENTION

As is well-known in the art, the exhaust produced by an internal combustion engine typically includes a variety of gases, particulate, and some fluids (e.g., droplets of motor oil and unburned fuel) that are directed into an exhaust system. In general, known exhaust systems do not prevent the gases and unconsumed fluids from exiting the exhaust systems.

SUMMARY OF THE INVENTION

For the foregoing reasons, there is a need for an internal combustion engine exhaust modification system that overcomes or mitigates one or more of the defects or disadvantages of the prior art.

In its broad aspect, the invention provides an internal combustion engine exhaust modification system for transforming exhaust emissions from an internal combustion engine into modified exhaust emissions. The exhaust modification system includes a housing extending between inlet and outlet ends thereof. The system also includes an impeller rotatably mounted in the housing, and a filter subassembly downstream from the impeller. The filter subassembly removes part of particulate matter and liquid droplets in the exhaust emissions to transform the exhaust emissions into modified exhaust emissions. The system includes a conduit extending between an inner end thereof positioned to direct cooler air exiting therefrom into the housing toward the filter subassembly, and an outer end thereof. The system also includes a funnel subassembly having a funnel body for directing the cooler air into the outer end of the conduit.

BRIEF DESCRIPTION OF THE DRAWINGS

The invention will be better understood with reference to the attached drawings, in which:

FIG. 2A is an isometric view of an embodiment of an impeller of the invention, drawn at a larger scale;

FIG. 2B is an isometric view of another embodiment of the impeller of the invention;

FIG. 3A is a cross-section of the system of FIG. 1, taken along line B-B' in FIG. 1;

FIG. 3B is a cross-section of the system of FIG. 1, taken along line A-A' in FIG. 1;

DETAILED DESCRIPTION

Figure 1:
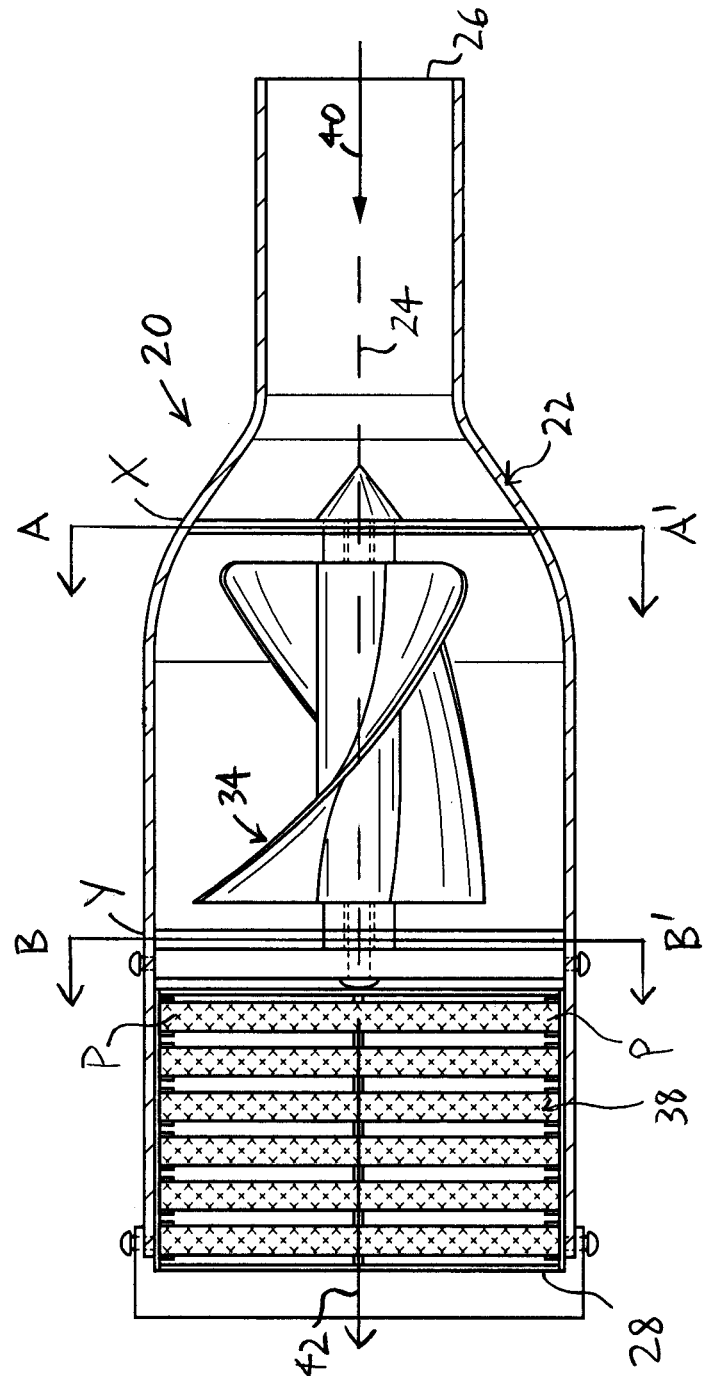
FIG. 1 is a longitudinal cross-section of an embodiment of an internal combustion engine exhaust modification system of the invention.

In the attached drawings, like reference numerals designate corresponding elements throughout. Reference is first made to FIGS. 1, 2A, and 3A-4B to describe an embodiment of an internal combustion engine exhaust modification system in accordance with the invention indicated generally by the numeral 20. As will be described, the internal combustion engine exhaust modification system 20 is for transforming exhaust emissions from an internal combustion engine into modified exhaust emissions.

In one embodiment, the exhaust modification system 20 includes a housing 22 defined by a housing axis 24 and extending between an inlet end 26, at which the exhaust emissions are received in the housing 22, and an outlet end 28, at which the modified exhaust emissions exit the housing 22 (FIG. 1). Preferably, the housing 22 has a first cross-sectional area therein at a first location "X" (FIG. 3B) that is downstream from the inlet end 26 relative to the exhaust emissions moving into the housing 22, and a second cross-sectional area at a second location "Y" (FIG. 3A) that is downstream from the first location "X", the second cross-sectional area being larger than the first cross-sectional area. The system 20 preferably also includes an impeller 34 rotatably mounted in the housing 22 (FIGS. 1, 2A).

The impeller 34 preferably is rotatable about an axis 36 (FIG. 2A) thereof that is coaxial with the housing axis 24, for accelerating particulate matter and liquid droplets in the exhaust emissions moving past the impeller outwardly from the axis 36. It is also preferred that the system 20 includes a filter subassembly 38 positioned downstream relative to the impeller 34 (FIG. 1). The filter subassembly 38 preferably is configured to collect at least part of the particulate matter and the liquid droplets in the exhaust emissions, for removing the part of the particulate matter and the liquid droplets from the exhaust emissions, to form the exhaust emissions into the modified exhaust emissions. As will also be described, the filter subassembly 38 preferably is permeable to the modified exhaust emissions.

In FIG. 1, arrow 40 represents the direction of the exhaust emissions flowing into the housing 22 at the inlet end 26, and arrow 42 represents the direction of the modified exhaust emissions exiting the housing 22 at the outlet end 28. It is preferred that, as the exhaust emissions flow through the housing 22, the exhaust emissions are formed into the modified exhaust emissions. Those skilled in the art would appreciate that the exhaust emissions include various gases (e.g., CO, and $CO_2$) as well as particulate matter and tiny liquid droplets, that may be present due to, among other things, incomplete combustion of the fuel in the internal combustion engine. The exhaust emissions are formed into the modified exhaust emissions by removal of at least part of the particulate matter and the liquid droplets from the exhaust emissions, as the exhaust omissions move through the housing 22.

As can be seen in FIG. 1, the impeller 34 preferably is located between the first and second locations "X", "Y". Those skilled in the art would also appreciate that the speed of the exhaust emissions at the second location "Y" is greater than the speed of the exhaust emissions at the first location "X", in accordance with Bernoulli's principle. In addition, the impeller 34 is designed to accelerate the particular matter and the liquid droplets outwardly from the impeller axis 36, which is coaxial with the housing axis 24. Accordingly, the exhaust emissions are accelerated in the direction indicated by arrows 40 and 42 due to the shape of the housing 22, and the exhaust emissions are at substantially the same time also centrifugally accelerated by the impeller 34. Because the particulate matter and the liquid droplets are included in the exhaust emissions, the particulate matter and the liquid droplets are also accelerated accordingly.

The filter subassembly 38 preferably is located downstream relative to the impeller 34. The filter subassembly 38 preferably is formed to catch the particulate matter and the liquid droplets that are accelerated radially away from the axis 36 of the impeller 34. However, once the particulate matter and the liquid droplets are substantially removed from the exhaust emissions, the balance remaining (referred to herein as the modified exhaust emissions) includes primarily gases, and may include only small amounts of particulate matter and the liquid droplets. The filter subassembly 38 preferably is also designed to be substantially permeable relative to the modified exhaust emissions.

The net result is that the particulate matter and the liquid droplets tend to accumulate in the peripheral region "P" of the filter subassembly 38 (FIG. 1), thereby removing at least part of the particulate matter and the liquid droplets from the exhaust emissions. As a result, the exhaust emissions become the modified exhaust emissions (i.e., due to the removal from the exhaust emissions of at least part of the particulate matter and the liquid droplets). Preferably, the modified exhaust emissions exit the housing 22 at the outlet end 28, flowing in the direction indicated by arrow 42.

Those skilled in the art would appreciate that the filter subassembly 38 may have any suitable form. Preferably, the filter subassembly 38 includes a support structure 44 for supporting a number of filter elements 46. Preferably, the individual filter elements 46 may be individually removed from time to time, for cleaning, and then returned to the support structure 44 thereafter. Alternatively, when necessary, the filter elements 46 may be replaced.

Figure 4B:
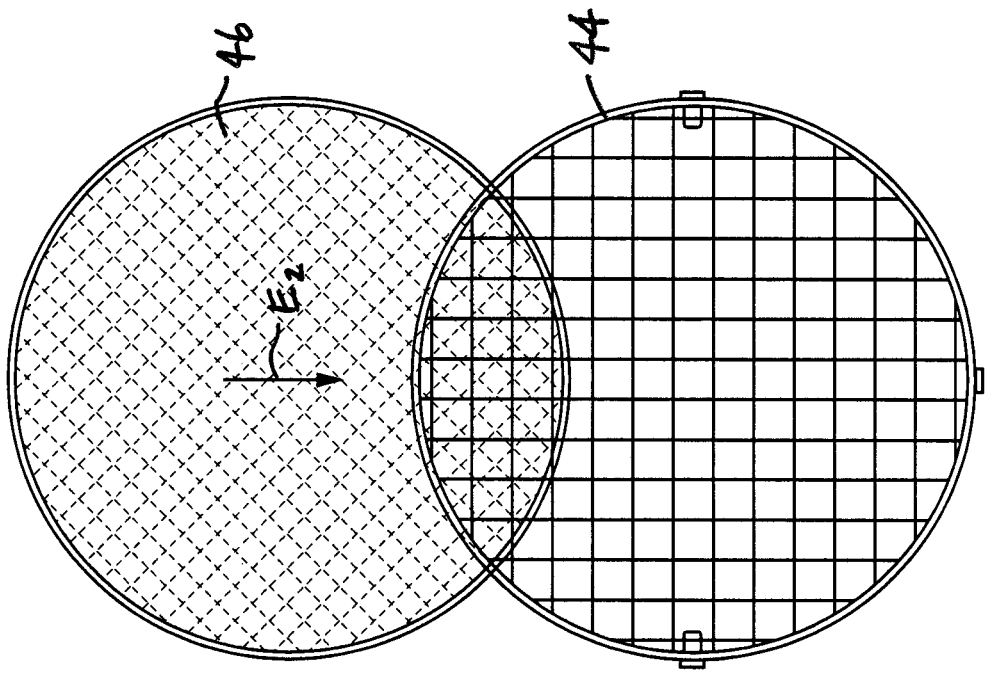
FIG. 4B is an end view of the filter subassembly of FIG. 4A.
Figure 4A:
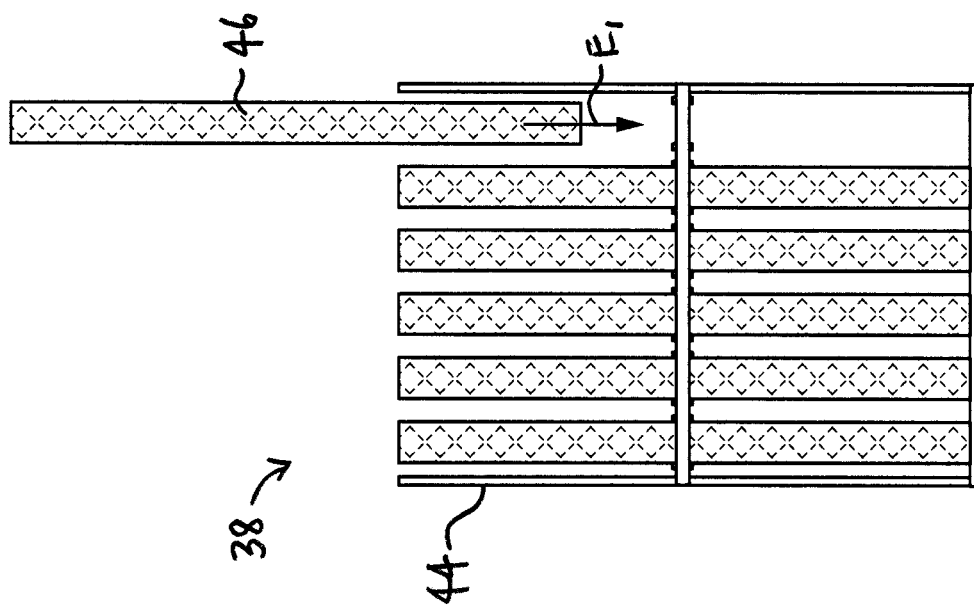
FIG. 4A is a side view of a filter subassembly of the invention, drawn at a larger scale.

The movement of the filter elements 46 into the support structure 44 is schematically indicated by arrows "$E_1$" and "$E_2$" in FIGS. 4A and 4B. It will be understood that the filter elements 46 preferably are movable out of the support structure 44 by moving the filter elements 46 in a direction opposite to the direction indicated by arrows "$E_1$" and "$E_2$".

It will also be understood that the impeller 34 may have any suitable shape. For exemplary purposes, an alternative embodiment of the impeller 34' is illustrated in FIG. 2B. As can be seen in FIGS. 2A and 2B, the impellers 34, 34' each include axles 47. Each axle 47 is aligned with the axis of the impeller respectively.

As can be seen in FIGS. 1, 3A, and 3B, the impeller 34 preferably is supported in the housing by impeller support assemblies 48, 50. Each of the impeller support assemblies 48, 50 preferably includes a bearing 52 in which the axle 47 is journalled. The bearing 52 preferably is held in position (i.e., coaxial with the housing axis 24) by a plurality of arms 54. In one embodiment, the arms 54 extend radially from the bearing 52 to a ring 56 that is formed to fit within the housing 22 at one of the predetermined locations, i.e., at "X" or at "Y". It will be understood that the rings 56 are secured inside the housing 22, at the locations "X" and "Y" respectively.

Those skilled in the art would appreciate that the exhaust system in which the exhaust modification system is included may also include other elements, e.g., a muffler and a catalytic converter (not shown). As is known in the art, where a conventional exhaust system is utilized, a certain amount of residue remains in the engine, as a result of combustion. However, it is believed that the system of the invention draws the residue out of the engine and into the exhaust modification system, to be caught in the filter subassembly therein.

Figure 5:
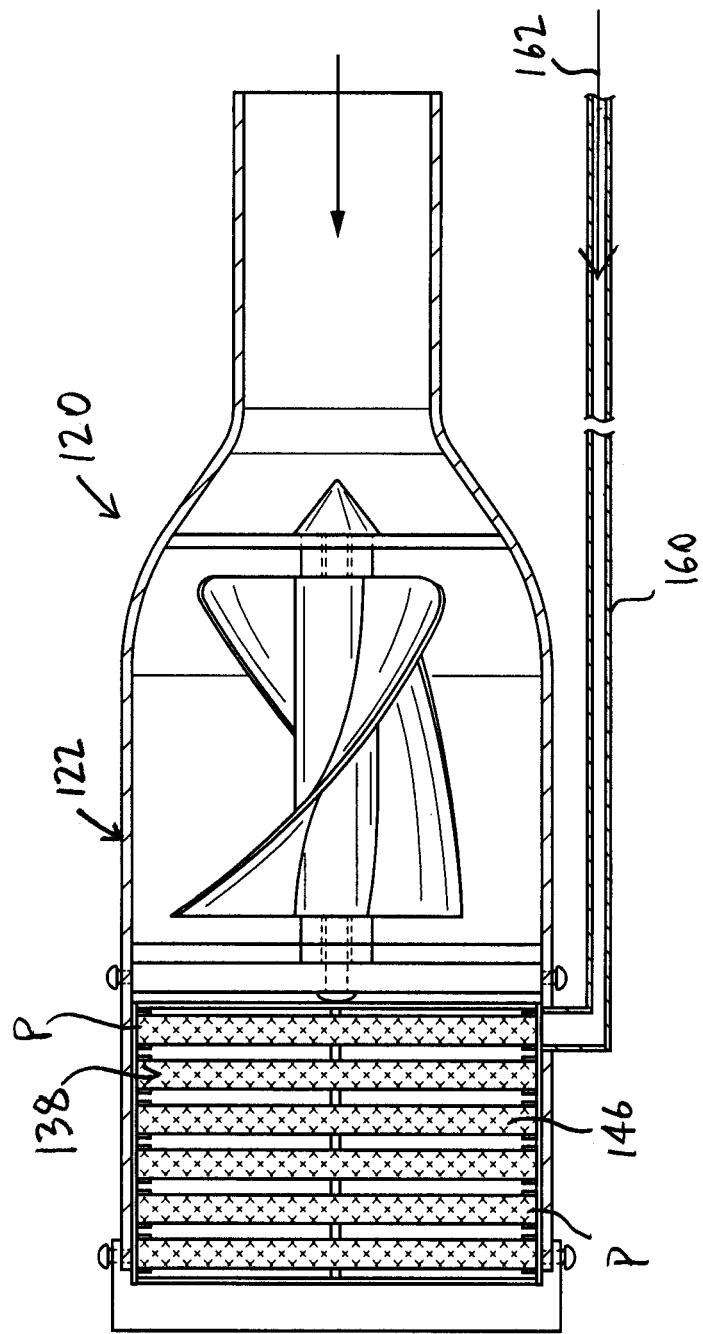
FIG. 5 is a longitudinal cross-section of an alternative embodiment of the internal combustion engine exhaust modification system of the invention, drawn at a smaller scale.

An alternative embodiment of the system 120 is illustrated in FIG. 5. Those skilled in the art would appreciate that, if the filter element is cooled to a temperature that is less than the temperature of the exhaust emissions, more of the particulate matter and the liquid droplets adhere to the filter 146, particularly in the peripheral region "P" of the filter element. Accordingly, the system 120 preferably includes a conduit 160 through which a volume of cooler air may be introduced into a housing 122, to cool one or more filter elements 146 in a filter subassembly 138 located in the housing 122.

The cool air is directed through the conduit 160 in the direction indicated by arrow 162. The cool air may be provided by any suitable source. For instance, in one embodiment, the cool air may be provided by an air conditioning unit (not shown) mounted in the automobile.

In another alternative embodiment, the internal combustion engine exhaust modification system 220 of the invention preferably includes a housing 222 defined by a housing axis 224 thereof. The housing 222 preferably extends between an inlet end 226, at which the exhaust emissions are received in the housing 222 via an inlet end opening 227 that is coaxial with the housing axis 224, and an outlet end 229, at which the modified exhaust emissions exit the housing 222.

It is also preferred that the housing 222 has a first cross-sectional area therein at a first location "2X" that is downstream from the inlet end 226 relative to the exhaust emissions received into the housing 222, and a second cross-sectional area at a second location "2Y" that is downstream from the first location. Preferably, the second cross-sectional area is larger than the first cross-sectional area, so that the exhaust emissions at the first cross-sectional area flow faster relative to the housing 222 than the exhaust emissions at the second cross-sectional area.

Preferably, the system 220 includes an impeller 234 rotatably mounted in the housing 222. It is preferred that the impeller 234 is rotatable by the exhaust emissions directed via the inlet end opening 227 into the housing 222 about an axis 236 of the impeller 234 that is coaxial with the housing axis 224, for drawing the exhaust emissions out of the engine and for accelerating particulate matter and liquid droplets in the exhaust emissions outwardly from the axis 236 of the impeller 234. The exhaust emissions are drawn into the housing 222 via the inlet end opening 227, as schematically represented by arrow 240 in FIG. 6.

In one embodiment, the system 220 preferably also includes a filter subassembly 238 located in the housing, positioned downstream relative to the impeller 234. Preferably, the filter subassembly 238 includes one or more filter elements 246 configured to collect at least part of the particulate matter and the liquid droplets in the exhaust emissions, for removing the at least part of the particulate matter and the liquid droplets from the exhaust emissions to form the exhaust emissions into the modified exhaust emissions. It is also preferred that the filter subassembly 238 is permeable to the modified exhaust emissions. From the foregoing it can be seen that the impeller 234 is driven to rotate about its axis 236 by the exhaust emissions flowing into the housing 222, and while it is rotating, the impeller 234 draws the exhaust emissions into the housing 222 and also directs at least part of the particulate matter and the liquid droplets of the exhaust emissions to a peripheral region "2P" of the filter subassembly 238. As a result, at least part of the particulate matter and at least part of the liquid droplets in the exhaust emissions accumulate in the peripheral region "2P" as the impeller 234 is driven by the exhaust emissions moving past the impeller 234, in the direction generally indicated by arrow 240. It will be understood that the particulate matter and the liquid droplets may also accumulate elsewhere on the filter elements 246.

As noted above, the particulate matter and liquid droplets in the exhaust emissions are undesirable by-products of the combustion in the internal combustion engine, resulting to some extent from incomplete combustion of the hydrocarbon fuel. Those skilled in the art would appreciate that the modified exhaust emissions that exit the housing 222, as schematically represented by arrow 242, pollute the ambient atmosphere less than the exhaust emissions would have done, if the exhaust emissions were released into the ambient atmosphere instead of being directed into the housing 222.

Figure 6:
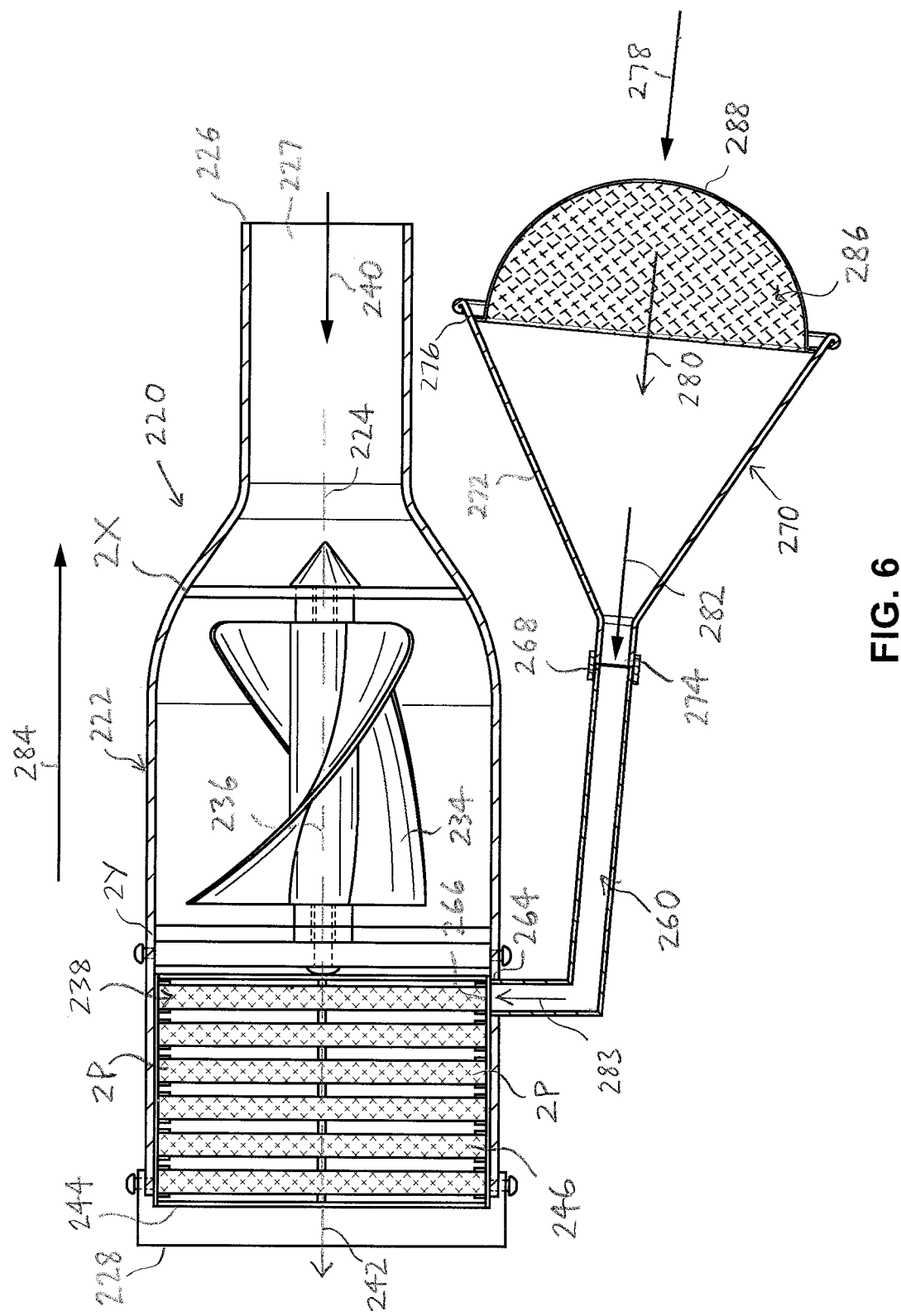
FIG. 6 is a longitudinal cross-section of another alternative embodiment of the internal combustion engine exhaust modification system of the invention, including a funnel subassembly connected to a conduit thereof.
Figure 7:
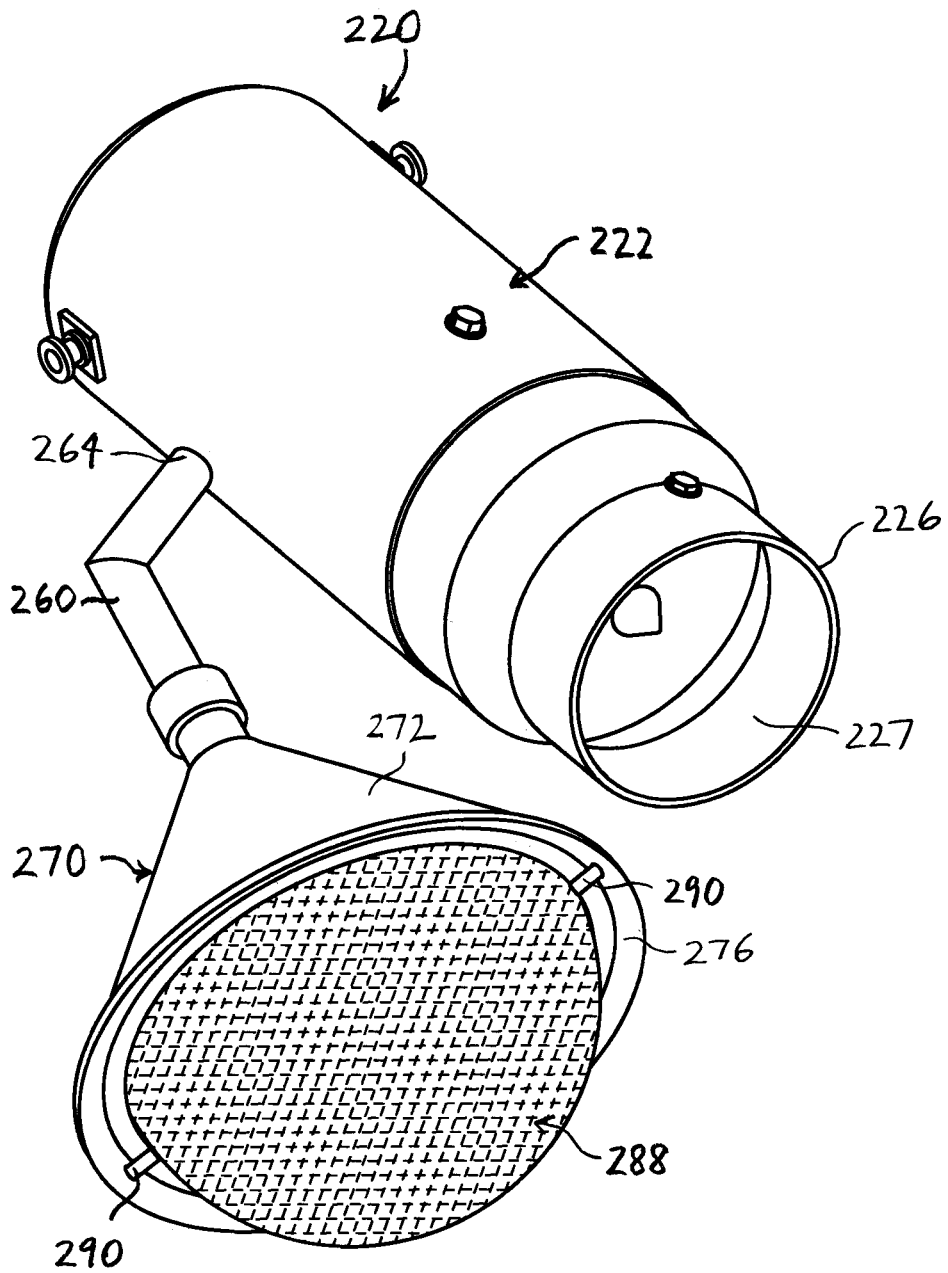
FIG. 7 is an isometric view of the funnel subassembly, the conduit, and the housing of the embodiment of the system of FIG. 6.

In one embodiment, and as can be seen in FIGS. 6 and 7, the system 220 preferably includes a conduit 260 extending between an inner end 264 thereof positioned to direct cooler air exiting the conduit 260 therethrough into the housing 222 at an exit location 266 at least partially upstream to the filter subassembly 238 relative to the impeller 234, and an outer end 268 thereof positioned distal to the filter subassembly 238.

It is also preferred that the system 220 includes a funnel subassembly 270 (FIGS. 6, 7). In one embodiment, the funnel subassembly 250 preferably includes a funnel body 272 that extends an output end 274 thereof that is connected with the outer end 268 of the conduit 260, and an input end 276 thereof that is positioned distal to the outer end 268 of the conduit 260. As will be described, the funnel body 272 preferably is configured for collecting the cooler air at the input end 276 and channeling the cooler air into the outer end 268 of the conduit 260.

It will be understood that the system 220 is intended to be mounted in a vehicle (not shown) that is powered by an internal combustion engine. Accordingly, it will also be understood that the vehicle is movable forwardly when the engine is operating, and such forward direction of the vehicle is generally indicated by arrow 284 in FIG. 6.

From the foregoing, it can be seen that, when the vehicle is moving in its forward direction (i.e., the direction indicated by arrow 284), air from the ambient atmosphere moves into the funnel subassembly 270 in the direction indicated by arrow 278, due to the forward movement of the vehicle. The forward movement of the vehicle provides the impetus for moving the cooler air into the funnel body 272 and subsequently down the conduit 270 and into the housing 222. It is believed that, once the cooler air is introduced into the housing 222 at the exit location 266, the cooler air is drawn into the exhaust emissions that are flowing through the housing 222 into the filter elements 246.

As can be seen in FIG. 6, cooler air moves into the funnel body 272 at the input end 276 thereof, as schematically represented by arrows 278 and 280. The cooler air passes from the funnel body 272 and into the outer end 268 of the conduit 260 via the output end 274, which is connected to the outer end 268, as schematically represented by arrow 282 in FIG. 6. The cooler air is directed along the conduit 260 to flow into the housing 222 at the exit location 266, as indicated by arrow 283.

As noted above, in an alternative embodiment, cooler air from the vehicle's air conditioning unit may be directed into the conduit 160, which directs the cooler air into the housing 122, toward the filter subassembly 138 therein. It is intended that the embodiment of the system 220 that is illustrated in FIGS. 6 and 7 is utilized when the air in the ambient atmosphere is sufficiently cool that the air conditioning unit in the vehicle may not be used. As noted above, in the system 220, cooler air preferably is taken from the ambient atmosphere when the vehicle is moving in its forward direction. The cooler air from the ambient atmosphere may be used in the housing instead of, or in addition to, the cooler air that may be taken from the vehicle's air conditioning unit.

As can be seen in FIG. 6, it is preferred that the filter subassembly 238 includes a number of filter elements 246 for filtering the exhaust emissions, and a support structure 244 for supporting the filter elements 246. Preferably, each of the filter elements 246 is removable from the support structure 244, for cleaning or replacement thereof.

As can be seen in FIGS. 6 and 7, it is preferred that the funnel subassembly 238 includes a funnel filter 286, for filtering the cooler air that is directed into the funnel body 272. Those skilled in the art would appreciate that the funnel filter 286 preferably is configured to be sufficiently coarse to permit the cooler air to flow into the funnel body 272 relatively freely, but also sufficiently fine to prevent larger particles of dirt from entering into the funnel body 272.

Those skilled in the art would also appreciate that the funnel filter 286 preferably is cleaned from time to time, to remove dirt (not shown) that accumulates on an exterior side 288 of the funnel filter 286 (FIG. 6). Preferably, the funnel subassembly 270 includes one or more clip elements 290 for releasably securing the funnel filter 286 to the funnel body 272. The user (not shown) is able to remove the funnel filter 286 relatively easily, by removing the clip elements 290, and is also then able to clean the funnel filter 286, to remove dirt that has accumulated on the exterior side 288 of the funnel filter 286. Preferably, once the funnel filter 286 has been cleaned, the funnel filter 286 may be repositioned on the funnel body 272, and secured thereon by the clip elements 290.

It will be understood that, when the cooler air is directed through the conduit 260 into the housing 222, the filter elements 246 are cooled thereby to a temperature that is less than a temperature of the exhaust emissions. In this situation, because the filter elements 246 are cooler than the exhaust emissions, the particulate matter and the liquid droplets in the exhaust emissions tend to collect on the filter elements 246. It will be understood that the filter elements 246 are easily removed and cleaned.

It will also be understood that the funnel subassembly 270 may be used, in an area that is subject to a cooler climate, during winter months, which is a time when the air conditioning unit in the vehicle is unlikely to be used. If the conduit 160 is also mounted to the housing (FIG. 5), then the vehicle's air conditioning unit may provide cooler air during the warmer months.

As described above, the filter subassembly 238 at least partially removes particulates and liquid droplets from the emissions flowing through the filter subassembly 238, so that the emissions that exit from the housing's outlet end 228 have fewer particulates and liquid droplets than the exhaust emissions that entered the housing's inlet end 226. This means less pollution (fewer particulates and liquid droplets) going into the ambient atmosphere from the outlet end 228 of the housing 222. Also, directing cooler air (i.e., air that is cooler than the exhaust emissions flowing into the filter subassembly 238) into the filter subassembly 238 cools the filter elements 246, and the particulates and liquid droplets are more likely to attach to the filter elements 246 that are somewhat cooler than the exhaust emissions. Because of this, introducing the cooler air into the housing 222 from the conduit 270 causes relatively more particulates and more liquid droplets to be removed from the exhaust emissions flowing through the filter subassembly 238.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A method of removing particulate matter and liquid droplets from exhaust emissions from an internal combustion engine, the method comprising:
   (a) providing a housing defined by a housing axis and extending between an inlet end, at which the exhaust emissions are received in the housing via an inlet end opening that is coaxial with the housing axis, and an outlet end, at which the modified exhaust emissions exit the housing;
   (b) providing an impeller rotatably mounted in the housing, the impeller being rotatable by the exhaust emissions directed via the inlet opening into the housing about an axis of the impeller that is coaxial with the housing axis, for drawing the exhaust emissions out of the engine and for accelerating particulate matter and liquid droplets in the exhaust emissions outwardly from the axis;
   (c) providing a filter subassembly located in the housing downstream from the impeller, the filter subassembly comprising a support structure receivable in the housing and at least one filter element being positionable in the support structure when the support structure is in the housing, the filter subassembly being positioned downstream relative to the impeller, the filter subassembly being configured to collect at least part of the particulate matter and the liquid droplets in the exhaust emissions, for removing the at least part of the particulate matter and the liquid droplets from the exhaust emissions to form the exhaust emissions into the modified exhaust emissions, the filter subassembly being permeable to the modified exhaust emissions;
   (d) directing the exhaust emissions into the inlet end opening, to rotate the impeller about the axis thereof, for accelerating the at least part of the particulate matter and the liquid droplets in the exhaust emissions moving past the impeller outwardly from the axis, to accumulate the at least part of the particulate matter and the liquid droplets on a peripheral region of said at least one filter element;
   (e) providing a conduit extending between an inner end thereof positioned to direct air exiting the conduit therethrough into the housing at an exit location that is at least partially upstream to the filter subassembly relative to the impeller, and an outer end thereof positioned distal to the filter subassembly, the air directed through the conduit being cooler than the exhaust emissions;
   (f) providing a funnel subassembly comprising a funnel body extending between an output end thereof that is connected with the outer end of the conduit, and an input end thereof that is positioned distal to the outer end of the conduit, the funnel body being configured for collecting the cooler air at the input end and channeling the cooler air into the outer end of the conduit;
   (g) with the cooler air directed through the conduit, cooling said at least one filter element to a temperature that is less than a temperature of the exhaust emissions, for collecting the particulate matter and the liquid droplets on said at least one filter element;
   (h) permitting the particulate matter and the liquid droplets to accumulate on the peripheral region of said at least one filter element;
   (i) removing said at least one filter element from the support structure;
   (j) after removal thereof, cleaning said at least one filter element, for removal of the particulate matter and the liquid droplets from the peripheral region thereof; and
   (k) subsequently positioning said at least one filter element in the support structure.

2. The method according to claim 1 additionally comprising:
   providing a funnel filter, for filtering dirt particles from the cooler air that is directed into the conduit.

3. The method according to claim 2 additionally comprising:
   providing at least one clip element for releasably securing the funnel filter to the funnel body, wherein the funnel filter is removed to clean the funnel filter to remove the dirt particles from the funnel filter, and the funnel filter, once cleaned, is securable to the funnel body by said at least one clip element.

* * * * *